(12) United States Patent
Schneider et al.

(10) Patent No.: US 7,458,268 B2
(45) Date of Patent: *Dec. 2, 2008

(54) LIVE-SCAN ULTRASONIC FOUR-FINGER PLANAR IMAGING SCANNER

(75) Inventors: John K. Schneider, Snyder, NY (US); Jack C. Kitchens, Tonawanda, NY (US); Stephen M. Gojevic, Buffalo, NY (US)

(73) Assignee: Ultra-Scan Corporation, Amherst, NY (US)

( * ) Notice: Subject to any disclaimer, the term of this patent is extended or adjusted under 35 U.S.C. 154(b) by 393 days.

This patent is subject to a terminal disclaimer.

(21) Appl. No.: 11/035,532

(22) Filed: Jan. 14, 2005

(65) Prior Publication Data

US 2005/0157912 A1 Jul. 21, 2005

Related U.S. Application Data

(60) Provisional application No. 60/536,816, filed on Jan. 15, 2004.

(51) Int. Cl.
*G01N 29/024* (2006.01)
*G01S 15/00* (2006.01)
*G06K 9/00* (2006.01)

(52) U.S. Cl. .................. 73/620; 73/622; 382/124

(58) Field of Classification Search .......... 73/620, 73/621, 622; 600/459, 437, 443–445; 382/124–127
See application file for complete search history.

(56) References Cited

U.S. PATENT DOCUMENTS

| | | | | |
|---|---|---|---|---|
| 4,533,365 | A * | 8/1985 | Ringel ................. | 95/114 |
| 5,647,364 | A * | 7/1997 | Schneider et al. ........ | 600/445 |
| 5,935,071 | A * | 8/1999 | Schneider et al. ........ | 600/445 |
| 6,181,807 | B1 * | 1/2001 | Setlak et al. ............ | 382/124 |
| 6,296,610 | B1 * | 10/2001 | Schneider et al. ........ | 600/445 |
| 6,914,517 | B2 * | 7/2005 | Kinsella ............... | 340/5.83 |
| 2005/0054926 | A1 * | 3/2005 | Lincoln ............... | 600/443 |
| 2005/0117786 | A1 * | 6/2005 | Schneider et al. ........ | 382/124 |
| 2005/0196022 | A1 * | 9/2005 | Schneider et al. ........ | 382/124 |
| 2006/0013453 | A1 * | 1/2006 | Schneider et al. ........ | 382/124 |

* cited by examiner

*Primary Examiner*—Hezron E. Williams
*Assistant Examiner*—Jacques M. Saint-Surin
(74) *Attorney, Agent, or Firm*—Hodgson Russ LLP

(57) ABSTRACT

The invention includes a system and a method of scanning fingerprints. A system may include an imaging surface, an ultrasound transducer, a probe arm joined to the transducer, a driver capable of moving the pivot location linearly and the transducer arcuately, a measurer capable of measuring linear and arcuate positions of the transducer, and a coupler capable of coupling information corresponding to linear and arcuate positions of the transducer with information from the transducer.

14 Claims, 4 Drawing Sheets

LIVE-SCAN ULTRASONIC FOUR-FINGER PLANAR IMAGING SCANNER

CROSS-REFERENCE TO RELATED APPLICATION

This application claims the benefit of priority to U.S. provisional patent application Ser. No. 60/536,816, filed on Jan. 15, 2004.

FIELD OF THE INVENTION

The present invention relates to ultrasonic fingerprint scanning systems.

BACKGROUND OF THE INVENTION

The invention may be used to obtain information related to the friction-ridge-detail of a finger, or more than one finger. The friction-ridge-detail information may be used to provide an image of the friction-ridge-detail, also referred to herein as the finger print.

SUMMARY OF THE INVENTION

The present invention includes a method of scanning fingerprints. For example, such a method may include receiving a finger on an imaging surface, providing an ultrasonic transducer capable of providing information corresponding to a fingerprint of the finger. A linear position of the ultrasonic transducer may be recorded to provide a linear recording, and an arcuate position of the ultrasonic transducer may be recorded to provide an arcuate recording. An ultrasonic signal may be sent from the ultrasonic transducer toward the finger and the signal may be reflected by the finger. The reflected signal may be received at the ultrasonic transducer. Information about the reflected ultrasonic signal may be recorded and coupled to with the linear recording and the arcuate recording to provide coupled information. The ultrasonic transducer may then be moved arcuately, and a new set of coupled information may be created and recorded. Once a desired number of pieces of coupled information are recorded, the ultrasonic transducer may be moved linearly. Then a desired number of sets of coupled information may be recorded for that linear position in the manner described above.

A fingerprint scanning system may include an imaging surface capable of receiving a finger, an ultrasound transducer capable of providing information corresponding to a fingerprint of the finger, and a probe arm joined to the transducer. The probe arm may have a pivot location about which the probe arm pivots. The scanning system may also include a driver capable of moving the pivot location linearly and the transducer arcuately, a measurer capable of measuring linear and arcuate positions of the transducer, and a coupler capable of coupling information corresponding to linear and arcuate positions of the transducer with information from the transducer.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
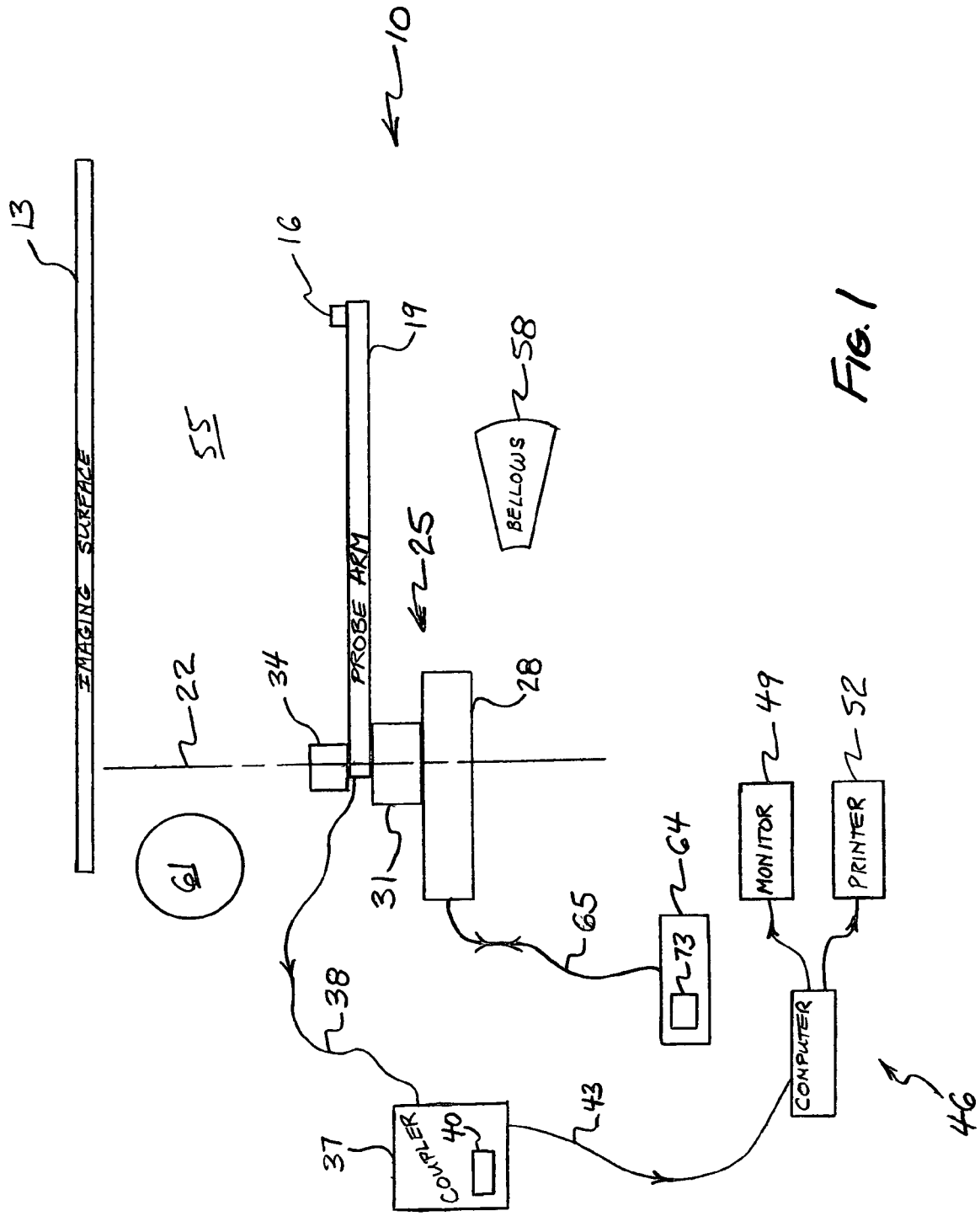
FIG. 1, which is a schematic showing features of a system according to the invention.
Figure 2:
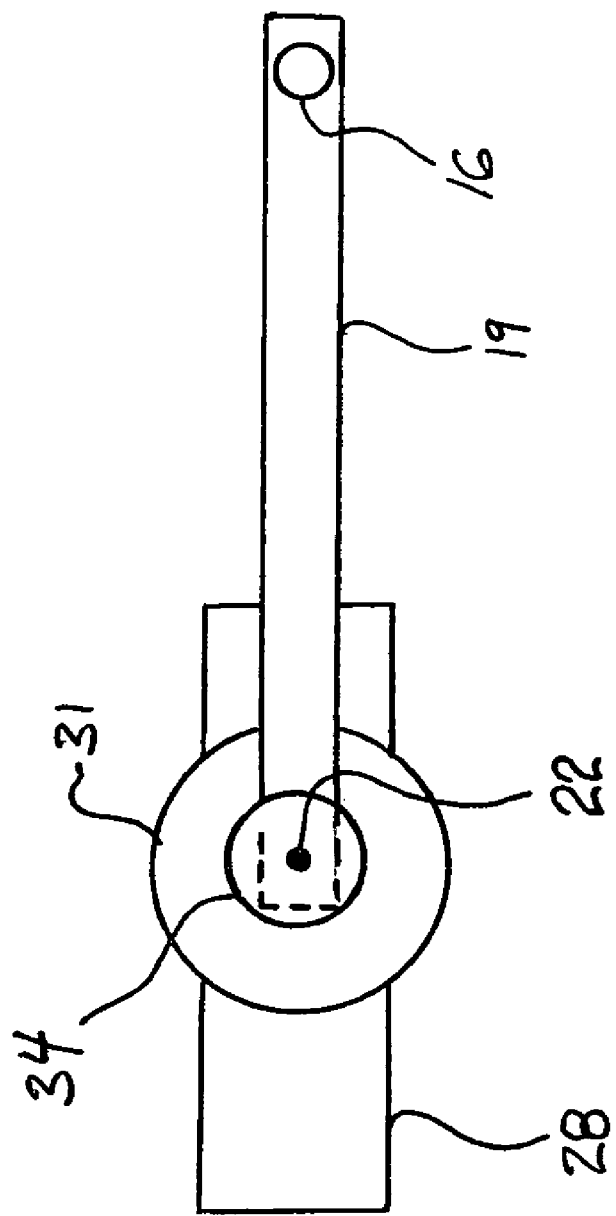
FIG. 2, which is a plan view of some of the features depicted in FIG. 1.

FIG. 1 depicts an embodiment of the fingerprint scanning system. The scanning system 10 may include an imaging surface 13 capable of receiving a finger. The imaging surface 13 may be a polished substantially planar synthetic resin. The scanning system 10 may also include an ultrasound transducer 16 capable of providing information corresponding to a fingerprint of the finger. A probe arm 19 may be included, and joined to the transducer 16. The probe arm 19 may be pivotable about a pivot location 22. A driver 25 may be provided, which is capable of moving the pivot location linearly and the transducer arcuately. The driver 25 may be comprised of two subsystems. One such subsystem 28 may be dedicated primarily to linearly moving the pivot location 22 and another such subsystem 31 may be primarily dedicated to arcuately moving the transducer 16. The transducer 16 may be moved arcuately by pivoting the probe arm 19 about the pivot location 22.

A measurer 34 may be provided, which is capable of measuring linear and arcuate positions of the transducer 16. The measurer 34 may include a rotary optical encoder and code wheel for measuring the arcuate position of the transducer. To measure the linear position of the transducer, the measurer 34 may include a programmed microprocessor and associated memory for counting the number of times the linear-movement subsystem 28 executes a move of a predetermined distance. By knowing the number of moves and the predetermined distance, the transducer position may be determined.

The measurer 34 and the transducer 16 may be linked to a coupler 37 via a communication channel 38. The coupler 37 may be capable of coupling the linear and arcuate positions of the transducer 16 with information from the transducer 16. The coupler 37 may include software and a computer memory 40. The memory 40 may be used to store the linear position, the arcuate position and the corresponding information from the transducer 16. The software may be used to cause a computer to store coupling information, which identifies a particular set of information as being related to each other. A set of coupled information may include a linear position, an arcuate position and a piece of transducer information, such as the time it took an ultrasound signal to travel from the transducer 16 to the finger and back to the transducer 16.

A communications system 43 may be joined to the memory 40 in order to receive and transmit the stored information. When it is desired to create an image of the scanned fingerprint, the coupling information may be used to retrieve a set of information. The retrieved set of information may be sent via the communications system 43 to a computer system 46. From the retrieved set of information, the computer system 46 may be used to determine from the transducer information whether a ridge or a valley of the fingerprint was detected. Using the arcuate position and the linear position information in the retrieved set, the computer system 46 may be used to properly position an indicator corresponding to the transducer information. The indicator may be an illuminated pixel on a monitor 49 of the computer system 46, or the indicator may be a spot of ink printed on a piece of paper by a printer 52 of the computer system 46. By displaying a large number of such indicators, each indicator being representative of a different retrieved set of information, an image of the fingerprint may be provided.

The scanning system 10 may include a fluidic ultrasound transmission medium 55 between the imaging surface 13 and the transducer 16. In one embodiment of the invention, the transducer 16 is immersed in the transmission medium 55. A suitable transmission medium 55 is mineral oil. An elastomeric bellows 58 may also be provided to keep the transmission medium 55 between the transducer 16 and the imaging surface 13 by expanding and contracting as components of the scanning system 10 expand and contract. Such expansion and contraction of the components may be caused by temperature changes. Further, a molecular sieve 61 may be provided to remove unwanted material from the transmission medium 55, such as gas bubbles.

The scanning system 10 may include a control system 64. The control system 64 may control the position of the transducer 16 via a communication link 65. The position of the transducer 16 may be controlled by controlling the linear position of the pivot location 22 and the angular position of the probe arm 19. The angular position of the probe arm 19 may be changed by a rotary solenoid 67. The linear position of the pivot location 22 may be changed by a stepper motor that moves a carriage 70. The carriage 70 may support the rotary solenoid 67, probe arm 19 and transducer 16. The control system 64 may include a microprocessor 73 programmed to move the transducer 16, and use the transducer 16 to obtain information about a finger on the imaging surface 13, and thereby coordinate the gathering of transducer position information and fingerprint information needed to create an image of the fingerprint.

Figure 3:
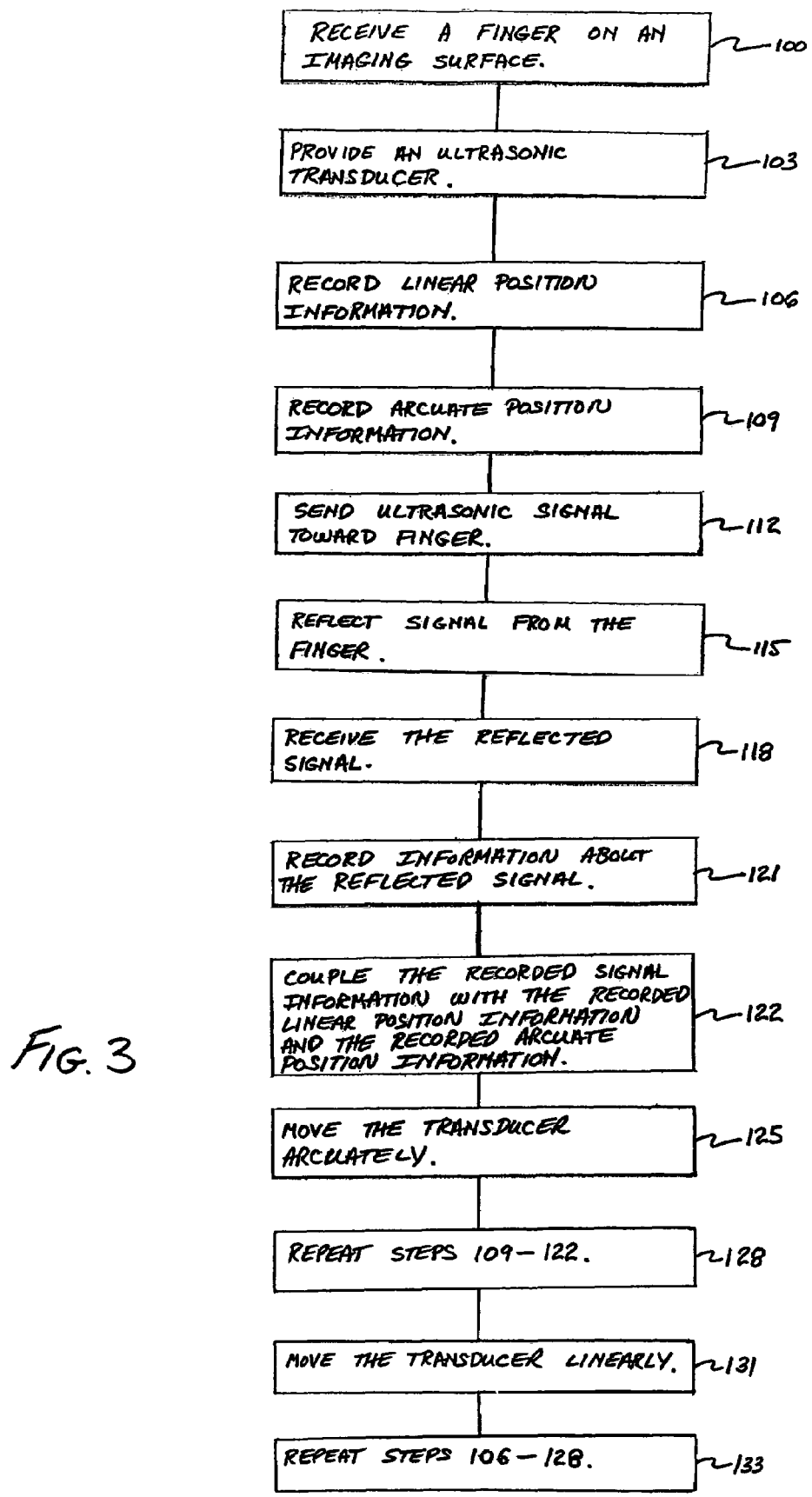
FIG. 3, which is a flow chart of a method according to the invention.
Figure 4:
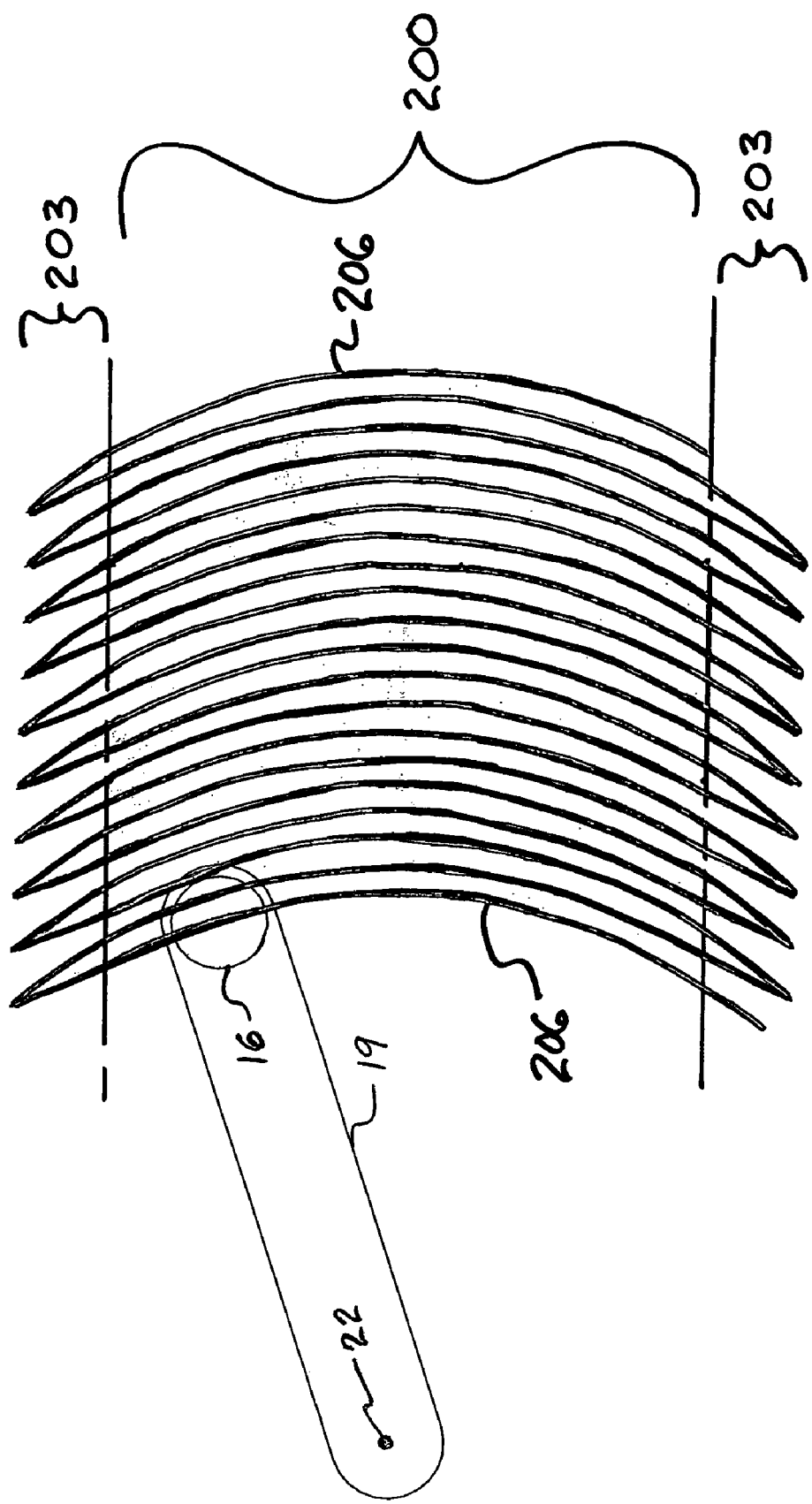
FIG. 4, which is a schematic depicting the motion of the transducer.

The invention may be embodied as a method of scanning a fingerprint. FIG. 3 depicts one such method in which a finger may be received 100 on an imaging surface. An ultrasonic transducer may be provided 103. The transducer may be capable of providing information corresponding to a fingerprint of the finger. A linear position of the ultrasonic transducer may be recorded 106, for example in a memory, to provide a linear recording. An arcuate position of the ultrasonic transducer may be recorded 109, for example in a memory, to provide an arcuate recording. An ultrasonic signal may be sent 112 from the ultrasonic transducer toward the finger, and the ultrasonic signal may be reflected 115 from the finger. The reflected signal may be received 118 at the ultrasonic transducer. Information about the reflected signal may be recorded 121, for example in a memory, to provide recorded signal information. The linear recording, arcuate recording and recorded signal information may be coupled 122 so that the coupled information may be recognized as being related to each other.

Next, the arcuate position of the transducer may be changed 125 by moving the transducer arcuately. A new set of coupled information may be created 128, in a manner similar to that described above. After a desired number of coupled information sets have been created, the linear position of the transducer may be changed 131 by moving the transducer linearly. Then, sets of coupled information corresponding to the new linear position may be created 133. The sets of coupled information may be used to generate an image of the fingerprint.

The signal information may be the change in time between sending the ultrasonic signal and receiving the reflected ultrasonic signal. By knowing the time that lapsed between sending and receiving, it is possible to determine whether a ridge of the fingerprint or a valley of the fingerprint reflected the signal. Ridges in the fingerprint will have a shorter lapsed time than valleys in the fingerprint. By knowing whether a ridge or a valley reflected the signal, and by knowing the position of the transducer, the friction-ridge-detail can be created.

During a scanning operation, the transducer may be moved arcuately in a first arcuate direction. When the transducer 16 is in a center sector 200, the transducer 16 may be caused periodically to send and detect ultrasound signals. When the transducer 16 is in one of the edge sectors 203, the pivot location 22 may be moved linearly, and the arcuate direction of the transducer movement may be changed to a second direction. It will be noted that arcuate movement of the transducer 16 may occur in the edge sectors 203. When the transducer 16 is in an edge sector 203, information produced by the transducer 16 may be ignored so that the information produced by the transducer 16 will be distributed along parallel arcuate scan lines 206.

Provisional patent application No. 60/536,816 describes embodiments of the invention. That provisional patent application is incorporated by reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A fingerprint scanning system comprising:
an imaging surface capable of receiving a finger;
an ultrasound transducer capable of providing information corresponding to a fingerprint of the finger;
a probe arm joined to the transducer, the probe arm having a pivot location;
a driver capable of moving the pivot location linearly and the transducer arcuately;
a measurer capable of measuring linear and arcuate positions of the transducer;
a coupler capable of coupling the linear and arcuate positions of the transducer with information from the transducer; and
a fluidic ultrasound transmission medium between the imaging surface and the transducer;
a gas scavenging molecular sieve.

2. The apparatus of claim 1 herein the fingerprint scanning system further comprising an elastomeric bellows.

3. The apparatus of claim 1 further comprising a control system for controlling the position of the pivot location.

4. The apparatus of claim 1 further comprising a microprocessor programmed to control the linear and arcuate positions of the transducer.

5. The apparatus of claim 1 further comprising a memory for storing information related to the linear and arcuate positions and information from the transducer.

6. The apparatus of claim 5 further comprising a communications system for transmitting the information from the memory to a computer system.

7. The apparatus of claim 6 wherein the computer system is suitable for displaying an image.

8. The apparatus of claim 1 wherein the imaging surface is made of a polished substantially planar synthetic resin.

9. A method of scanning a fingerprint comprising:
(A) receiving a finger on an imaging surface;
(B) providing an ultrasonic transducer capable of providing information corresponding to a fingerprint of the finger;

(C) recording a linear position of the ultrasonic transducer to provide a linear recording;

(D) recording an arcuate position of the ultrasonic transducer to provide an arcuate recording;

(E) sending an ultrasonic signal from the ultrasonic transducer through a fluidic ultrasound transmission medium toward the finger;

(F) receiving a reflected ultrasonic signal at the ultrasonic transducer;

(G) recording information about the reflected ultrasonic signal;

(H) coupling the recorded signal information with the linear recording and the arcuate recording;

(I) moving the ultrasonic transducer arcuately;

(J) repeating steps D through H;

(K) moving the ultrasonic transducer linearly;

(L) repeating steps C through J; and (M) scavenging gas with a molecular sieve.

10. The method of claim 9 further comprising utilizing a control system to control the position of the pivot location.

11. The method of claim 9 further comprising utilizing a memory to store information related to the linear recording, arcuate recording and the recorded change in time.

12. The method of claim 11 further comprising transmitting the stored information.

13. The method of claim 12 further comprising using the transmitted information to display an image on the computer system.

14. The method of claim 9 further comprising recording signal information relating to a change in time between sending the ultrasonic signal and receiving the reflected ultrasonic signal.

* * * * *